June 11, 1940.  R. S. McKEEVER  2,204,509
OIL AND GAS SEPARATOR
Filed July 22, 1938
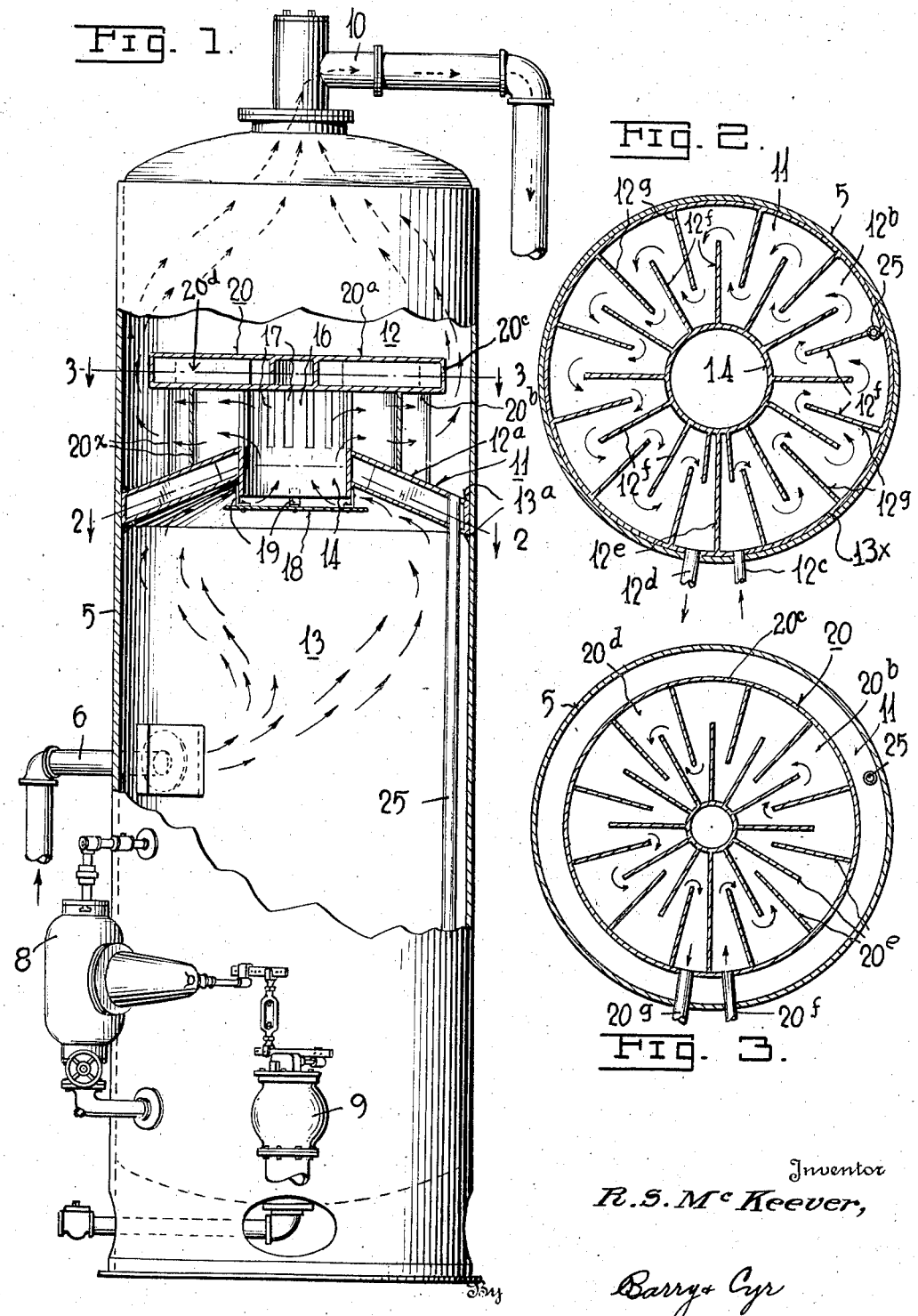
Inventor
R. S. McKeever,
By
Barry & Cyr
Attorneys Patented June 11, 1940

2,204,509

UNITED STATES PATENT OFFICE 2,204,509

OIL AND GAS SEPARATOR

Roy S. McKeever, Tulsa, Okla., assignor, by mesne assignments, to The Parkersburg Rig & Reel Company, Parkersburg, W. Va., a corporation of West Virginia Application July 22, 1938, Serial No. 220,805

2 Claims. (Cl. 183—2.7)

This invention relates to improvements in oil and gas separators and more particularly to specific improvements in the apparatus disclosed in my Patent No. 2,037,426, dated April 14, 1936. In the apparatus of that patent a substantially conical element forms a part of the separating means in the upper portion of the tank, and in accordance with the present invention I arrange a similar substantially conical element adjacent to the other one, and use them to provide a baffle chamber into which gas may be expanded for cooling purposes. Proper thickness of metal in the cones and supports between them, governs the refrigerating transfer and working pressure of the vessel. By expansion of the gas into this chamber, the walls of the chamber are cooled and in turn cool or refrigerate the rising gas in the separator with the result that heavier hydrocarbons are caused to condense and to be precipitated. Such chamber as a unit acts to condense and separate liquid in solution as well as in suspension, depending, of course, on the degree of refrigeration.

Obviously such unit can be employed with steam instead of a refrigerating gas, where it is necessary to treat an emulsified fluid or to eliminate freezing due to expansion as the treated fluid leaves the vessel.

The invention will now be explained in connection with the accompanying drawing, in which Fig. 1 is an elevation of a separator partly in vertical section and showing my improvements installed therein.

Fig. 2 is a transverse sectional view taken on the line 2—2 of Fig. 1.

Fig. 3 is a horizontal sectional view taken on line 3—3 of Fig. 1.

Referring to the drawing, 5 designates a fluid-tight tank of an oil and gas separator provided with an inlet pipe 6 by which a mixture of hydrocarbon oil and gas is introduced into a medial portion of the tank. A conventional float control 8 is arranged at one side of the tank and acts to control the outlet valve 9 through which the oil is discharged. Gas passes out of the top of the tank by way of an outlet fitting 10.

An annular partition 11 divides the interior of the casing into upper and lower chambers 12 and 13, and in accordance with the present invention, such partition is preferably formed of upper and lower spaced frusto-conical shaped imperforate sheets of metal 12a and 12b, each having its outer edge secured at 13a to an annular wall 13x.

A chimney 14 extends through the central portion of the partition and the inner annular edges of the sheets 12a and 12b are preferably welded to the outer surface of the chimney so as to provide a fluid-tight chamber within the partition.

As best shown in Fig. 2, such chamber is provided with an inlet nipple 12c and an outlet nipple 12d which are segregated from one another by a radial partition 12e which extends across the chamber from the chimney 14 to the shell 5.

Radial fins or baffles 12f project from the chimney into the chamber of the partition. Similar fins 12g project from the shell 5 into the chamber in a direction toward the chimney, and these fins form a tortuous passageway in the partition from the inlet 12c to the outlet 12d.

A portion of the chimney extends downwardly from the central portion of the partition and is imperforate while the upper portion 16 projects upwardly above the partition and is provided with a multiplicity of vertical elongated slots 17.

In order to prevent fluid in the chamber 13 from directly entering the lower end of the chimney, a baffle 18 is provided. It is preferably formed of a circular plate of greater diameter than the chimney and is held in spaced relation to the lower edge of the latter by means of brackets 19 which may be suspended from the chimney.

A cover 20 closes the upper end of the passageway, and it may be formed of circular baffle plates 20a and 20b of considerably greater diameter than the chimney but of less diameter than the interior of the shell 5. The edge portions of these plates may be connected by an annular wall 20c so as to provide a chamber 20d. If such a chamber cover is used, it may be provided with internal baffles 20e to form a tortuous passageway between an inlet 20f and an outlet 20g.

Spiral wings or blades 20x are positioned between the cover and partition and project outwardly from the chimney. Each of these blades has a horizontal top edge secured to the under surface of the cover. The lower edge of each wing slants downwardly and outwardly and snugly engages the substantially conical upper surface of the partition. The inner vertical edge of each wing coincides with an edge of one of the vertical slots in the chimney, and the outer edges of the wings are spaced apart a greater distance than their inner edges, whereby the velocity of the fluid flowing through the flaring passageways between the vanes will be decreased as the fluid travels toward the wall of the tank. The cover projects outwardly beyond the outer edges of the wings.

In operation, it will be understood that the admixed oil and gas enters the side of the separator shell through the pipe 6 which is positioned below the partition 11. The oil having more mass than the gas tends to fall to the bottom of the separator due to the action of gravity, and it can be discharged through the float control valve 9. The gas, however, has a tendency to rise, and it carries a quantity of oil in suspension and in direct solution from the main body of the oil. The purpose of my improvements is to remove this quantity of oil from the mixture and solution with the gas. The gas with oil in suspension and solution, will be hereinafter referred to as rich gas. As said gas rises, it comes into contact with the umbrella shed of partition 11, which due to the shape of its under-surface tends to guide the rich gas toward the axis of the separator. However, as the lower portion of the chimney 14 is imperforate, the rich gas must descend before it can enter the lower end of the chimney through the space between the plate 18 and the chimney. In thus traveling the rich gas is subjected to the refrigerating effect of the refrigerating fluid passing through the partition and, of course, liquid will be condensed out by refrigeration and also "knocked out" of the rich gas by impact with the chimney. Such liquid will gather on the surfaces of the partition and chimney and will then drop to the bottom portion of the shell.

As the gas passes up and out of the chimney, it will not only be whirled by the vanes 20a, but will be brought into contact with the cold upper surface of the partition 11, and due to the mechanical action and refrigerating effect, more liquid will be removed from the chamber, and it will drain through a pipe 25 into the lower portion of the shell.

Of course, if the cover 20 is used for refrigerating purposes, it will have the effect of giving more square feet of refrigerating surface.

As heretofore mentioned a heating fluid such as steam can be passed through the chamber of the partition, the chamber of the cover or both when heating is needed instead of refrigeration.

It will be evident that any suitable fluid at a required temperature may be passed through either the partition, the cover or both.

While I have disclosed what I now consider to be preferred embodiments of the invention, I am aware that changes may be made in the details disclosed without departing from the spirit of the invention as expressed in the claims.

What I claim and desire to secure by Letters Patent is:

1. In an oil and gas separator of the type having a tank provided with a lower oil outlet, an intermediate mixture inlet and an upper gas outlet, the improvement which comprises a substantially frusto-conical hollow partition positioned in the tank between the mixture inlet and the gas outlet, means for admitting a fluid into the partition and for discharging said fluid from the partition, a chimney extending through the central portion of the partition and having upper and lower portions, the upper portion of the chimney above the partition being slotted, a hollow cover closing the upper end of the chimney and projecting outwardly beyond the outer surface of the chimney, means for admitting a fluid into the cover and for discharging said fluid from the cover, and vanes extending outwardly from the upper portion of the chimney and positioned between said hollow cover and said partition for causing gas flowing from the chimney through the slots of the latter to flow toward the inner surface of the tank and to contact with the upper surface of the partition and the lower surface of the hollow cover.

2. In an oil and gas separator of the type having a tank provided with a lower oil outlet, an intermediate mixture inlet and an upper gas outlet, the improvement which comprises a substantially frusto-conical hollow partition positioned in the tank between the mixture inlet and the gas outlet, baffles in said hollow partition to provide a tortuous passageway therethrough, means for admitting a fluid into the partition and circulating the same therein, means for discharging said fluid from the partition, a chimney extending through the central portion of the partition and having upper and lower portions, the upper portion of the chimney above the hollow partition being slotted, a hollow cover closing the upper end of the chimney and projecting outwardly beyond the outer surface of the chimney, baffles in said hollow cover to provide a tortuous passageway therethrough, means for admitting a fluid into said hollow cover and circulating the same therein, means for discharging said fluid from the cover, and vanes extending outwardly from the upper portion of the chimney and positioned between said hollow cover and said hollow partition for causing gas flowing from the chimney through the slots in the latter to flow toward the inner surface of the tank and to contact with the upper surface of the partition and the lower surface of the hollow cover.

ROY S. McKEEVER.